United States Patent [19]

Dunkle

[11] Patent Number: 5,253,881
[45] Date of Patent: Oct. 19, 1993

[54] HAND TRUCK STAIR CRAWLER ASSEMBLY

[75] Inventor: Gary L. Dunkle, Wichita, Kans.

[73] Assignee: Harper Trucks, Inc., Wichita, Kans.

[21] Appl. No.: 933,716

[22] Filed: Aug. 24, 1992

[51] Int. Cl.$^5$ ................................................ B62B 5/02
[52] U.S. Cl. .................................................. 280/5.22
[58] Field of Search ...................... 280/5.22, 844, 5.2; 180/9.1, 9, 9.21; 305/52, 53

[56] References Cited

U.S. PATENT DOCUMENTS

| | | | |
|---|---|---|---|
| 2,132,069 | 10/1938 | Hall | 280/5.22 |
| 2,301,341 | 11/1942 | Stevens et al. | 280/5.22 |
| 2,412,290 | 12/1946 | Rieske | 280/844 |
| 4,290,618 | 9/1981 | Morton | 280/5.22 |
| 5,042,827 | 8/1991 | Mortenson | 280/5.22 |

FOREIGN PATENT DOCUMENTS

| | | | |
|---|---|---|---|
| 23692 | 11/1918 | Denmark | 280/844 |
| 890173 | 9/1953 | Fed. Rep. of Germany | 280/844 |
| 1084635 | 1/1955 | France | 280/844 |

Primary Examiner—Margaret A. Focarino
Assistant Examiner—Michael Mar
Attorney, Agent, or Firm—Phillip A. Rein

[57] ABSTRACT

A hand truck stair crawler assembly having a new and novel stair engaging crawler assembly mounted on a conventional hand truck assembly. The stair engaging crawler assembly includes a pair of spaced, cooperating stair crawler assemblies secured to the hand truck assembly, each having a main roller support assembly with a main roller assembly connected thereto. The main roller support assembly includes a pair of spaced bearing retainer plates secured by a plate connector assembly to the hand truck assembly. The main roller assembly includes a plurality of spaced roller bearings mounted within the bearing retainer plates and having an endless belt member mounted thereon for engagement with stairs for traversing thereof. The roller bearing member is of a special design having a central body portion with outer end belt retaining sections to support the endless belt member having contact and support entirely on a plurality of cooperating roller bearing members.

3 Claims, 2 Drawing Sheets

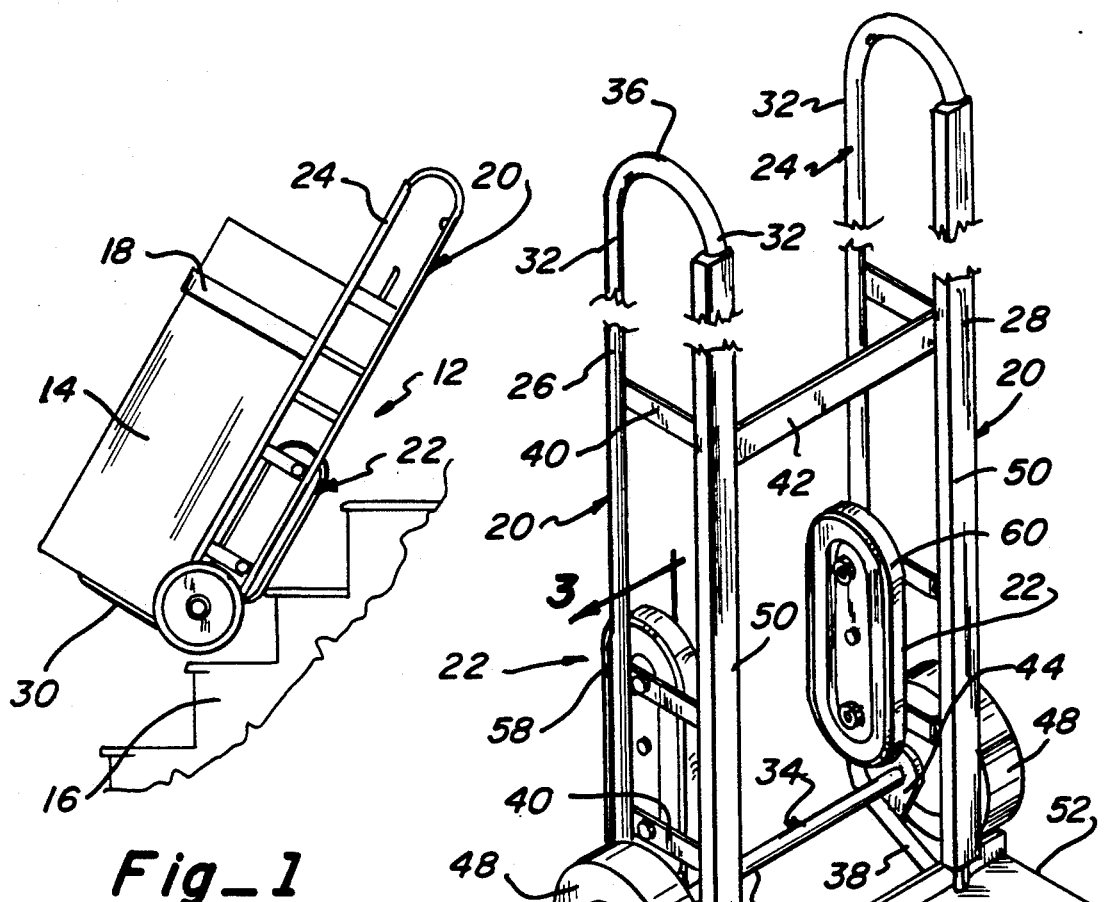
Fig_1
Fig_2
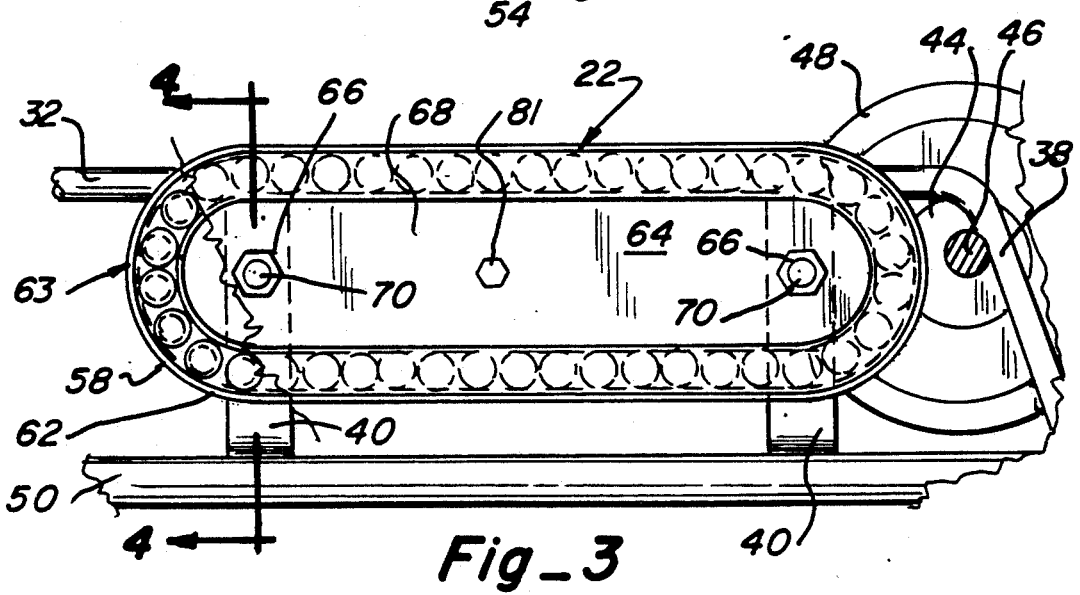
Fig_3

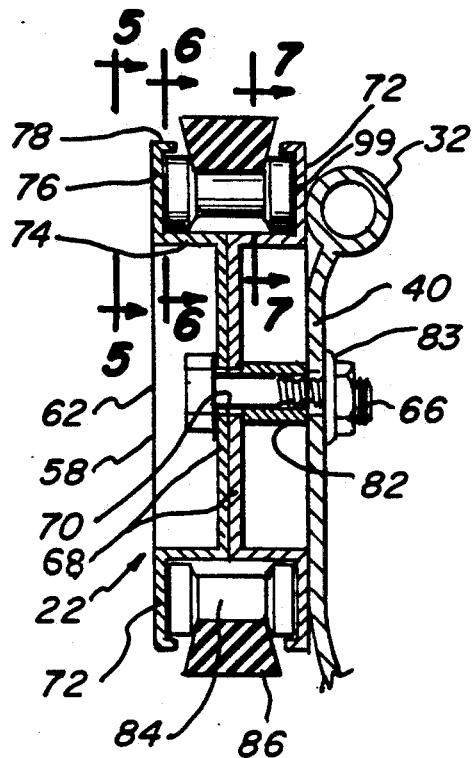
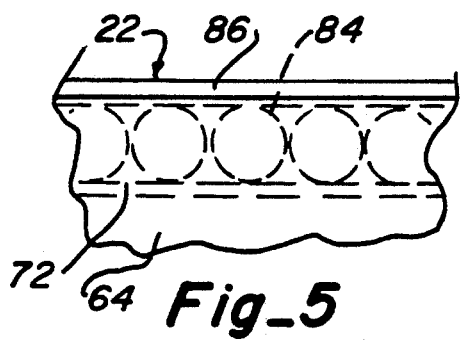
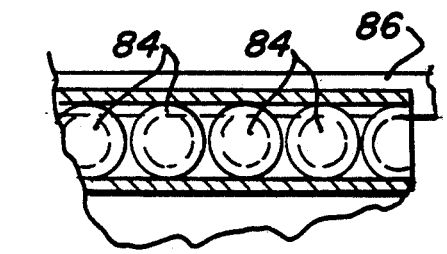
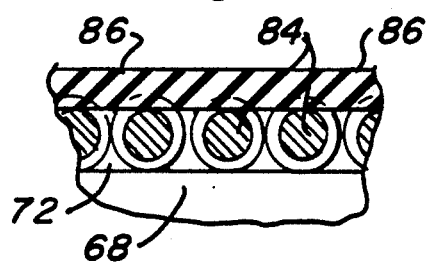
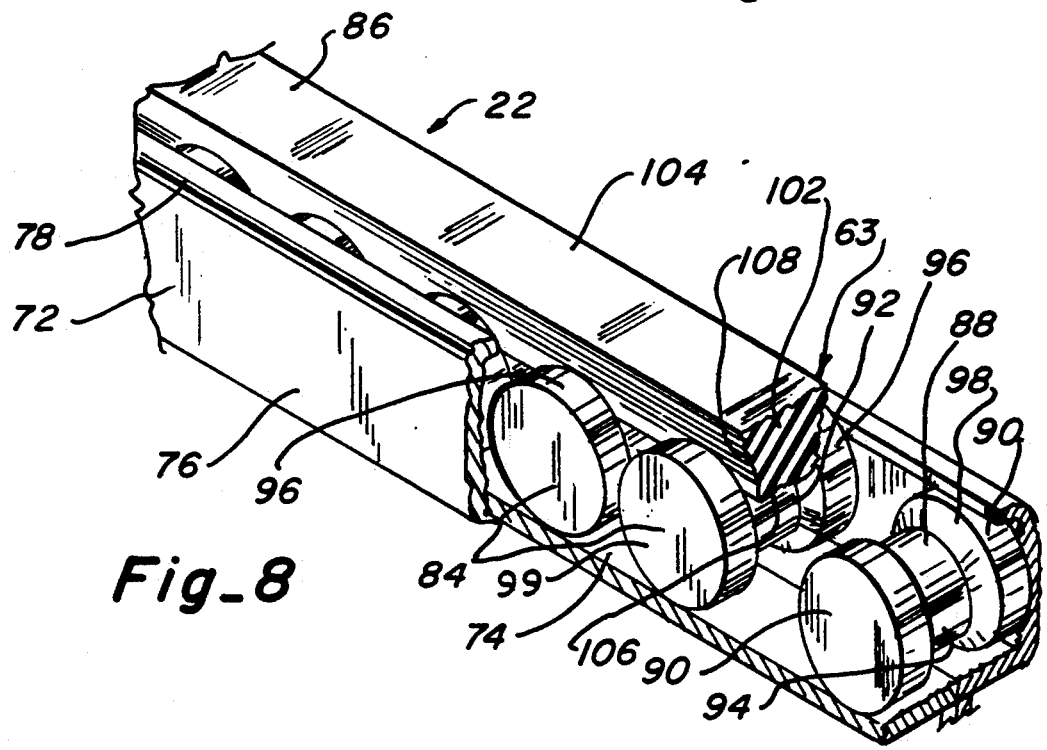

HAND TRUCK STAIR CRAWLER ASSEMBLY

PRIOR ART

A patent search was not conducted on this invention

PREFERRED EMBODIMENT OF THE INVENTION

In one preferred embodiment of this invention, a hand truck stair crawler assembly is utilized for receiving a cargo to be conveyed thereon secured by anchor straps to a basic support assembly for moving up and down inclined areas, stairs, or the like. The hand truck stair crawler assembly includes 1) a hand truck assembly; and 2) a stair engaging crawler assembly connected to the hand truck assembly.

The hand truck assembly is of a generally conventional nature having a main frame assembly with a pair of parallel support rail assemblies interconnected to each other supported on a lower end thereof by a support wheel assembly. A lower end of the support rail assemblies is connected to a cargo receiving assembly having a support plate to receive cargo to be transported thereon in a conventional manner.

The support wheel assembly is of a conventional nature having wheel members rotatably mounted on an axle or shaft member secured to the main frame housing for moving on a support surface similar to operation of any conventional hand truck assembly.

The novelty of this invention lies in the stair engaging crawler assembly which includes 1) a pair of spaced stair crawler assemblies, each being identical and secured in parallel relationship to the support rail assemblies, each having a main roller support assembly supporting a main roller assembly. Each main roller support assembly includes a pair of cooperating bearing retainer plates interconnected by a plate connector assembly.

Each bearing retainer plate includes a central support body, a plurality of anchor holes through the central support body, and a bearing retainer flange integral with the central support body. The bearing retainer flange includes an inner wall integral with a side wall which, in turn, is integral with a top wall and being of generally "L" shape in transverse cross section.

The plate connector assembly includes 1) nut and bolt members used with a washer member and a spacer member; and 2) a plate and connector nut and bolt to interconnect the two bearing retainer plates to each other having the bearing retainer flanges facing each other to form a bearing receiving area therebetween to receive a main roller assembly therein.

The main roller assembly includes 1) a plurality of roller bearing members mounted within the bearing receiving area; and 2) an endless belt member mounted about and engagable with the roller bearing members and extended outwardly from the top wall of the bearing retainer flanges.

Each roller bearing member is formed with a central bearing body section integral on opposite ends with an end belt retaining section. The central bearing body section is formed with a cylindrical body portion having an outer support surface to support an inner portion of the endless belt member thereon.

Each end belt retaining section is integral with respective outer ends of the central bearing body section and provided with an end roller portion integral with an inclined belt contact portion.

The endless belt member is of a conventional nature having a main belt body formed with a top wall, an inner contact wall, and side contact walls integral with the top wall and the inner contact wall. The side contact walls and the bottom wall are engagable with the outer support surface and the inclined belt contact portions only of respective ones of the roller bearing members.

OBJECTS OF THE INVENTION

One object of this invention is to provide a hand truck stair crawler assembly which can be mounted on various types of hand truck assemblies to provide a main roller assembly supporting an endless belt member on roller bearing members for ease of moving up and down a stair assembly or the like with a minimum amount of resistance to rotation of the endless belt member.

Another object of this invention is to provide a hand truck stair crawler assembly having a new and unique stair engaging crawler assembly with an endless belt member mounted on a plurality of cooperating roller bearing members to achieve full support of the endless belt member on the roller bearing members for a minimum amount of friction loss.

One further object of this invention is to provide a hand truck stair crawler assembly including a stair engaging crawler assembly mountable on numerous types of conventional hand truck assemblies with the stair engaging crawler assembly providing a new and novel minimum frictional contact of a plurality of roller bearing members against an endless belt member which is solely supported on subject roller bearing members.

One other object of this invention is to provide a hand truck stair crawler assembly of a new and novel design mountable on any conventional hand truck assembly providing a rotatable endless belt member mounted on a plurality of independent roller bearing members to achieve firm support with a minimum of friction loss.

Still, one further object of this invention is to provide a hand truck stair crawler assembly having a new and novel stair engaging crawler assembly which is economical to manufacture; easy to install on existing hand truck assemblies; easily removed for repair and maintenance; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a side elevational view of a hand truck stair crawler assembly of this invention having a load thereon and illustrating downward movement on a plurality of stairs on a stair assembly;

FIG. 2 is a foreshortened perspective view thereof;

FIG. 3 is an enlarged fragmentary sectional view taken along line 3—3 in FIG. 2;

FIG. 4 is an enlarged sectional view taken along line 4—4 in FIG. 3;

FIG. 5 is a fragmentary sectional view taken along line 5—5 in FIG. 4;

FIG. 6 is a fragmentary sectional view taken along line 6—6 in FIG. 4;

FIG. 7 is a fragmentary sectional view taken along line 7—7 in FIG. 4; and

FIG. 8 is a fragmentary enlarged perspective view illustrating a stair engaging crawler assembly having portions broken away for clarity.

The following is a discussion and description of preferred specific embodiments of the hand truck stair crawler assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a hand truck stair crawler assembly of this invention, indicated generally at 12, is illustrated as having a cargo 14 mounted thereon being used to traverse a plurality of vertically spaced steps 16 in a conventional manner known in the prior art. The cargo 14 is held on the hand truck stair crawler assembly 12 by an anchor strap 18 in a conventional manner.

The hand truck stair crawler assembly 12 includes a hand truck assembly 20 having a stair engaging crawler assembly 22 connected thereto. The hand truck assembly 20 can be of various types which can have the stair engaging crawler assembly 22 mounted thereon as will be explained.

As noted in FIG. 2, the hand truck assembly 20 includes a main support frame assembly 24 having a pair of spaced parallel support rail assemblies 26, 28 interconnected by a cargo receiving assembly 30 and mounted on a support wheel assembly 34.

Each support rail assembly 26, 28 includes 1) spaced, parallel support tube members 32 having upper ends interconnected by a handle section 36 and, at spaced, lower ends, interconnected by an inclined wheel support section 38; 2) spaced support plates 40 interconnecting the adjacent support tube members 32; and 3) a lateral support plate 42 interconnecting the spaced, support rail assemblies 26, 28.

The support wheel assembly 34 is of a conventional nature having axle support plates 44 secured to respective ones of the support rail assemblies 26, 28 operable to rotatably support an axle or shaft member 46 having a wheel member 48 mounted on respective outer ends of the axle member 46.

The cargo receiving assembly 30 includes a pair of cargo support channels 50 secured to spaced, forward ones of the support tube members 32 and connected at a lower end to an "L" shaped support plate 52. The support plate 52 includes a connector plate section 54 integral with a cargo toe plate section 56. The connector plate section 54 is secured to abutting portions of the support tube members 32 and the wheel support sections 38.

Therefore, it is noted that the hand truck assembly 20 can be of various types, mainly having a means thereon for supporting a cargo 14 vertically on the cargo toe plate section 56 which rests against the spaced cargo support channels 50 and normally held firmly through use of the anchor strap 18.

The hand truck assembly 20 operates in a conventional manner moving on a horizontal surface supporting the cargo 14 on the wheel members 48 and controlled by an operator thereof through grasping of the handle sections 36.

When a steep incline or stairs 16 are to be traversed, it is well known in the art that the cargo 14 is tipped back to an inclined position as noted in FIG. 1. The operator then utilizes the handle sections 36 to move the hand truck assembly 20 over a first one of the stairs 16. The hand truck 20 and the cargo 14 are tilted backwards to rest on a combination of one or more outer edges of the stairs 16 and weight is carried on a stair engaging crawler assembly which is known in the prior art.

The novelty in this invention rests in the stair engaging crawler assembly 22 which includes a pair of identical, spaced stair crawler assemblies 58, 60 and only one need be described in detail.

As noted in FIGS. 3 and 4, the stair crawler assembly 58 includes a main roller support assembly 62 having a main roller assembly 63 mounted thereon. The main roller support assembly 62 includes bearing retainer plates 64 interconnected by a plate connector assembly 66.

The bearing retainer plates 64 are utilized as a pair being identical and placed together with a central portion in an abutting relationship in order to support the main roller assembly 63 thereon in a manner to be explained.

Each bearing retainer plate 64 includes a central support body 68 having anchor holes 70 therein and an outer peripheral bearing retainer flange 72 integral with the central support body 68.

As shown in FIG. 4, each bearing retainer flange 72 is of generally "J" shape having an inner wall 74 integral with a side wall 76 which, in turn, is integral with a top wall 78. This "J" shape is first extended outwardly and then laterally about the outer periphery of the central support body 68 in order to retain a portion the main roller assembly 63 between the bearing retainer flanges 72 in a manner to be explained.

The plate connector assembly 66 includes 1) nut and bolt members 80 utilized with a respective spacer member 82 and a washer member 83; and 2) plate connector nut and bolts 81 used to interconnect abutting ones of the bearing retainer plates 64 (FIG. 4).

The nut and bolt members 66 are operable with the washer members 83 and spacer members 82 to interconnect the main roller support assembly 62 through the central support bodies 68 to the transverse support plates 40 as shown in FIG. 3.

The main roller assembly 63 includes a plurality of cooperating spaced roller bearing members 84 which, collectively, are operable to receive and support an endless belt member 86 thereabout.

Each roller bearing member 84 includes a central bearing body section 88 integral with outer, opposed end belt retaining sections 90.

The central bearing body section 88 has a cylindrical body portion 92 with an outer support surface 94 to support a portion of the endless belt member 86 thereon as will be explained.

Each end belt retaining section 90 includes an end roller portion 96 of a diameter greater than the cylindrical body portion 92 and connected thereto through an outwardly inclined belt contact portion 98.

Each end roller portion 96 is provided with an outer upright end wall 99 to limit axle movement of the overall main roller assembly 63 between the bearing retainer flanges 72 as noted in FIG. 4.

The endless belt member 86 is of a generally conventional nature including 1) a main belt body 102; 2) a top wall 104; 3) an inner contact wall 106; and 4) spaced inclined side contact walls 108 integral with the top wall 104 and the inner contact wall 106 as noted in FIG. 8.

USE AND OPERATION OF THE INVENTION

In the use and operation of the hand truck stair crawler assembly 12 of this invention, it is obvious that numerous types of hand truck assemblies 20 can be used being altered or adapted to receive the stair engaging crawler assembly 22 thereon.

More specifically, the hand truck assembly 20 as described is used whereupon the stair crawler assemblies 58, 60 are attached to respective, spaced traverse support plates 40 through use of the plate connector assembly 66 having the nut and bolt members 80 mounted through the anchor holes 70 and secured thereto with the spacer member 82 and washer member 83 as noted in FIG. 4.

The proper positioning of the stair engaging crawler assembly 22 on the main frame assembly 24 of the hand truck assembly 20 is known in the prior art so as to be engagable in an inclined position with the endless belt member 86 contacting the stair 16 as noted in FIG. 1.

Operation of the hand truck assembly 20 with the stair engaging crawler assembly 22 is well known in the prior art. The novelty of this invention lies in the specific construction and operation of the main roller support assembly 62 with the main roller assembly 63 as best noted in FIGS. 4-8, inclusive.

More specifically, as noted in FIG. 4, the stair crawler assembly 58 utilizes a plurality of abutting adjacent ones of individual roller bearing members 84 being held within the "J" shaped confines of the bearing retainer flanges 72 of the abutting bearing retainer plates 64.

Further, a specific novelty lies in the support and engagement of the rotatable endless belt member 86 being completely supported on adjacent ones of the roller bearing members 84.

It is noted that the inner contact wall 106 of the endless belt member 86 is contained between the inclined belt contact portions 98 and supported on the outer support surface 94 of the central bearing body section 88 of each roller bearing member 84 as clearly shown in FIG. 8.

Additionally, the side contact walls 108 of the endless belt member 86 are engaged and retained between the spaced inclined belt contact portions 98 of the end belt retaining sections 90 and will not engage the adjacent portions of the top wall 104 of the bearing retainer flanges 72. This provides a minimum frictional contact of the rotating load bearing endless belt member 86 during its rotational movement in respective vertical planes.

Therefore, it is seen that the stair engaging crawler assembly and, more specifically, each individual identical stair crawler assembly, provides for a new and novel movement of the rotating endless belt member achieved with a minimum amount of frictional resistance to rotation.

The hand truck stair crawler assembly of this invention is easy to mount on existing hand truck assemblies; economical to manufacture; providing low, almost nonexistent frictional resistance to rotational movement of an endless belt member engaging steps or other inclined surfaces being traversed; providing increased safety features to the user thereof; and substantially maintenance free.

While the invention has been described in conjunction with preferred specificc embodiments thereof, it will be understood this description is intended to illustrate and not to limit the scope of the invention, which is defined by the following claims:

I claim:

1. A hand truck stair crawler assembly including a stair engaging crawler assembly mounted on a conventional hand truck assembly, comprising:
    a) said stair engaging crawler assembly includes a stair crawler assembly having a portion extended laterally of said hand truck assembly for engaging and traversing an inclined support surface;
    b) said stair crawler assembly includes a main roller support assembly having a main roller assembly mounted thereon;
    c) said main roller assembly includes a plurality of roller bearing members mounted in abutting relationship in said main roller support assembly for independent rotational movement in an oblong path and an endless belt member mounted on said roller bearing members for movement in said oblong path;
    d) each of said roller bearing members having a central bearing body section integral at opposite ends with end belt retaining sections positioned outwardly of said central bearing body;
    e) said end belt retaining sections each having end roller portions with outer contact surfaces aligned with each other for support on said main roller support assembly with a minimum amount of friction loss and a pair of laterally spaced, outwardly inclined sidewalls extending between said central bearing body section and said outer contact surfaces of said end roller portions;
    f) said endless belt member having an outer wall and an inner contact wall integral with inclined side contact walls extending between said inner and outer walls and mounted for support on said central bearing body section and said end belt retaining section; whereby said inner contact wall and said inclined side contact walls of said endless belt member are in full and constant contact with said central bearing body section and said inclined sidewalls respectively of said roller bearing members and said endless belt member contacts and is supported solely on individual ones of said roller bearing members for ease of rotational movement with a minimum amount of friction loss during movement in said oblong path.

2. A hand truck stair crawler assembly as described in claim 1, including:
    a) another one of said stair crawler assemblies connected to and positioned laterally of said hand truck assembly for engaging and traversing the inclined support surface.

3. A stair crawler assembly adapted to be connected to a hand truck assembly for engaging and traversing an inclined support surface, such as inclined steps, in a conventional manner, comprising:
    a) a main roller support assembly including bearing retainer plates interconnected by a plate connector assembly and forming a bearing receiving area therebetween;
    b) a main roller assembly having a plurality of roller bearing members mounted in said bearing receiving area for movement in an oblong path and an endless belt member mounted about said roller bearing members, said endless belt having an outer wall, an inner contact wall, and inclined side contact walls extending between said inner and outer walls;

c) each of said roller bearing members having a central bearing body section integral with laterally spaced outwardly inclined sidewalls which, in turn, are integral with outer end roller portions;

d) said bearing retainer plates are each formed with a central support body integral with bearing retainer flanges about an outer periphery thereof;

e) said bearing retainer flanges being of generally "J" shape cooperating with an opposite one of said bearing retainer plates to form an inner wall and said bearing receiving area therebetween having said roller bearing members mounted therein; and f) said endless belt member being mounted with said inner contact wall and said inclined side contact walls of said belt member being in full and constant contact with said central bearing body section and said inclined sidewalls, respectively, of said roller bearing members said outer end roller portions being mounted against said inner wall of said bearing retainer plates for rotation of said roller bearing members with a minimum amount of friction loss for ease of movement of said endless belt member in said oblong path; more specifically, said outer support surface and said inclined belt contact portions to provide a minimum amount of friction loss during rotation thereof.

* * * * *